No. 781,318. PATENTED JAN. 31, 1905.
H. D. WEED.
GRIP TREAD FOR RUBBER TIRES.
APPLICATION FILED JULY 8, 1904.
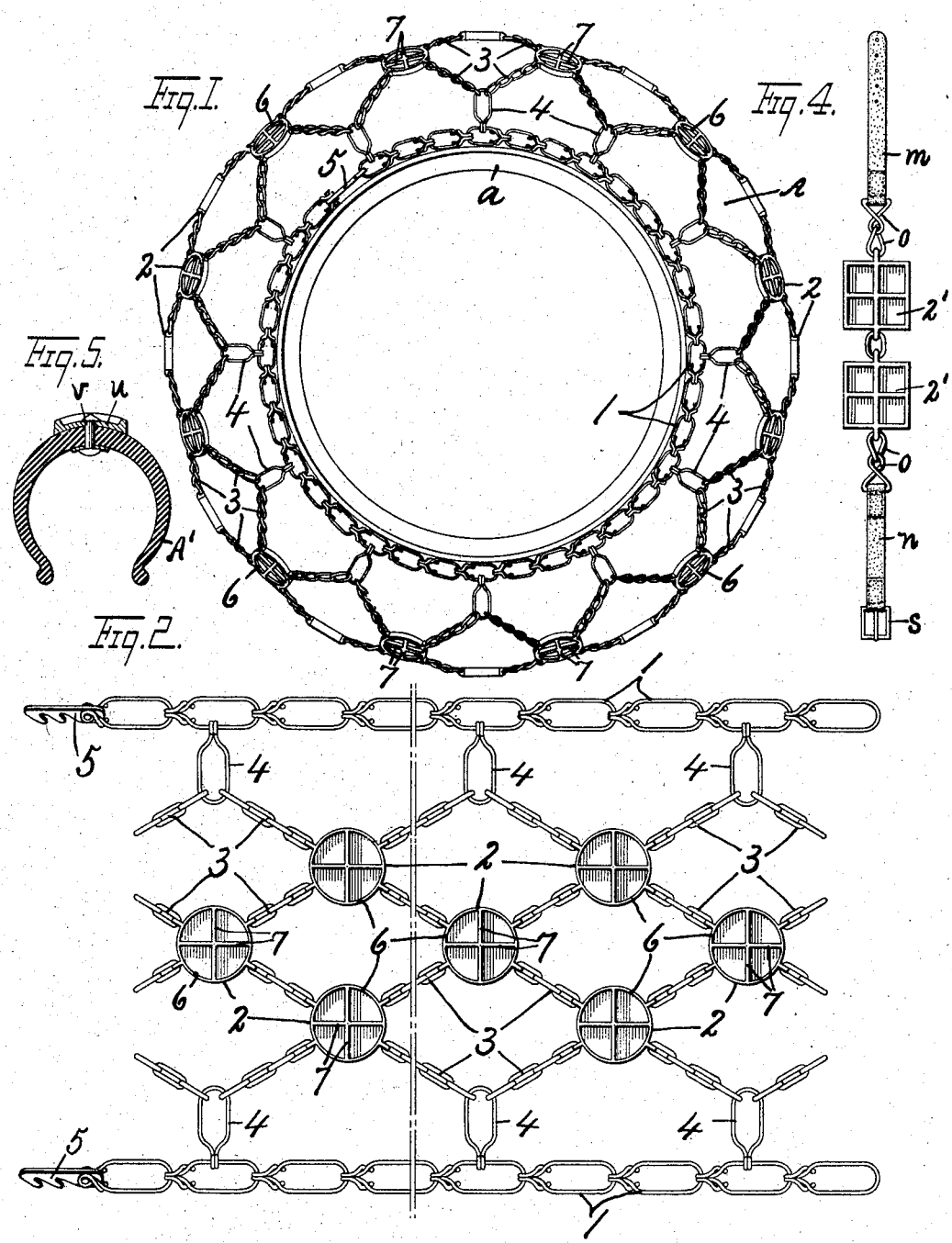

No. 781,318.

Patented January 31, 1905.

UNITED STATES PATENT OFFICE.

HARRY D. WEED, OF CANASTOTA, NEW YORK.

GRIP-TREAD FOR RUBBER TIRES.

SPECIFICATION forming part of Letters Patent No. 781,318, dated January 31, 1905.

Application filed July 8, 1904. Serial No. 215,812.

*To all whom it may concern:*

Be it known that I, HARRY D. WEED, of Canastota, in the county of Madison, in the State of New York, have invented new and useful Improvements in Grip-Treads for Rubber Tires, of which the following, taken in connection with the accompanying drawings, is a full, clear, and exact description.

This invention relates to improvements in gripping-treads for elastic tires, and is particularly applicable for use as a tread for pneumatic tires of automobiles to prevent slipping of the tires upon wet, muddy, or icy pavements. It is well known that in the operation of these machines over slippery pavements, and particularly where such pavements are rounded or slope transversely, the rear or traction wheels are inclined to skew or slide laterally, thus throwing the front and rear wheels out of alinement, which renders the steering mechanism ineffective and frequently causes serious accidents. This is particularly true on country roads, where the driveway is usually narrow and guttered at either side, and on the descent side of hills, where the speed of the vehicle is usually retarded, but it frequently happens that on account of the excessive weight at the rear of the vehicle the rear wheels will frequently slide to one side of the road when descending a slope to such an extent as to overturn the vehicle while under motion.

The object of my invention is to provide the tire with a removable gripping-tread which is not only flexible in all directions and held on by the inflation of the tire, but is also provided with ribbed plates or cups of such construction that the ribs or flanges of the cups dig into the pavement and prevent lateral sliding of the wheels, and also to afford a suitable gripping-surface for the traction-wheels, whereby the vehicle may be propelled without slipping of the tire upon the pavements.

Another object is to construct and apply the gripping-tread in such manner as to relieve as far as possible the direct wear upon the tires, thereby prolonging the life of the tires and preventing undue abrasion while traveling over broken-stone or rough pavements.

Other objects and uses will appear in the following description.

In the drawings, Figure 1 is an elevation of a pneumatic tire equipped with my improved tread. Fig. 2 is a plan of a portion of the detached gripping-tread seen in Fig. 1. Fig. 3 is a sectional view in perspective of a portion of one of the ribbed gripping-plates. Fig. 4 is a top plan of a modified construction of gripping-plate, showing also a modified means for applying the gripping-plates to the tire. Fig. 5 is a sectional view of a tire-tread, showing a further modified means for applying the gripping-plate to the tire.

Similar reference characters indicate corresponding parts in all the views.

A represents a pneumatic tire as mounted upon a suitable rim $a$, and to the outer surface of this tire is applied my improved gripping-tread, which consists, essentially, of opposite circular anchors 1 and a series of ribbed gripping-plates 2, which are joined to each other and to the circular anchors 1 by diverging chains 3 and links 4. The circular anchors 1 are substantially identical in construction and are located at opposite sides of the tire, but of less diameter than said tire, and each consists of a flexible jointed element, such as a chain having a hooked link 5 at one end, which is detachably interlocked with the link at the other end, as best seen in Fig. 1, to permit the tread to be removed and replaced when desired.

The plates 2 are each formed with a circular or annular rib 6, constituting a cup having cross-ribs 7 intersecting each other and extending across the plate with their opposite ends united to the annular rib 6, so as to afford intervening spaces between the ribs to enable said ribs to embed themselves into the pavement under the weight of the vehicle, and thereby prevent the vehicle-wheels from slipping upon the pavement. It will be seen upon reference to Figs. 1 and 2 that these gripping-plates 2 are flexibly connected to each other and to the links 4 by the jointed elements or chains 3 and that by attaching the links 4 to the circular chains or anchors 1 a complete flexible network is formed, which may be readily applied to or removed from the tire, as may be desired, by simply attaching or detaching the end links 5 at one end to the links at the opposite end of the circular chains or anchors 1.

It will be observed upon reference to Figs. 1 and 2 that the flexible connections 3 run diagonally across the face of the tire. The object of this is to permit a free radial flexibility of the parts of the tread intermediate the anchors and at the same time to prevent any endwise or lateral sliding movement of the plates 2 upon the surface of the tire while in use. This latter effect is important for the reason that it avoids as far as possible any wearing or abrasive effect due to friction between the tread and surface of the tire. In this connection it may be stated that the tread is placed upon the tire while deflated, and the ends of the anchors are then connected together, after which the tire is inflated, and thereby causes the plates 2 and chains 3 to be partially embedded into the surface of the tire, thus holding the tread from circumferential movement with reference to the tire.

Although I have shown and described these chains 3 as extending diagonally across the face of the tire, it is evident that the plates 2 may be otherwise connected to the circular anchors 1 and that the construction and manner of attaching these circular anchors to the tire may be considerably varied without departing from the spirit of this invention. Therefore I do not limit myself to the precise construction shown and described nor to the exact construction of gripping plate or cup 2. My main object is to provide a removable tread for the tire which is flexible in all directions and is provided with a series of gripping-plates having ribs on their outer faces extending circumferentially and transversely of the tread of the tire.

In Fig. 4 I have shown a pair of rectangular gripping-plates 2', which are linked together and are provided with marginal and transverse ribs on their outer faces similar to the ribs 6 and 7. (Shown in Figs. 1, 2, and 3.) These plates are adapted to be applied transversely to the surface of the tire at certain intervals by means of straps $m$ and $n$, which are flexibly united to the opposite sides of the plates 2' by links $o$ and are adapted to be strapped around and under the tire and rim, the strap $n$ being provided with a buckle $s$ for this purpose. In this instance each pair of plates or a single plate, if desired, is separately applied to the tire at such positions as may be desired.

In Fig. 5 I have shown a further modified means of applying a ribbed plate, as $u$, to the periphery of a tire, as A', said means consisting of a rivet or stud $v$, which is passed through apertures in the plate $u$ and A' and is upset at its inner and outer ends to firmly secure the two parts $u$ and A'. It is evident that by linking these plates close together an armor or shield is formed which protects the tire from abrasion on broken-stone roads and also affords protection against puncture.

Having thus described my invention, what I claim, and desire to secure by Letters Patent, is—

1. A grip-tread for elastic tires comprising a series of cups removably applied to the outer surface of the tire, and means to hold said cups in operative position.

2. In a tread for elastic tires a series of cups, each having its base detachably applied to the tire.

3. In a tread for rubber tires, a series of metal plates each having a comparatively thin annular rib on its outer face.

4. In a grip-tread for elastic tires, the combination with opposite circular side pieces, of cross-pieces lying against the tread of the tire, and a series of cups connected to the cross-pieces and each having transverse rib within the flange of the cup.

5. In a grip-tread for elastic tires, the combination with opposite circular side pieces, of cross-pieces lying against the tread of the tire, and a series of cups connected to the cross-pieces, and each having intersecting transverse ribs within the flange of the cup.

In witness whereof I have hereunto set my hand this 28th day of June, 1904.

HARRY D. WEED.

Witnesses:
H. E. CHASE,
MILDRED M. NOTT.